US012692956B2

(12) United States Patent
Bae

(10) Patent No.: US 12,692,956 B2
(45) Date of Patent: Jul. 28, 2026

(54) FLOW PATH SWITCHING VALVE

(71) Applicant: AUTOELEX CO., LTD., Gimhae-si (KR)

(72) Inventor: Jongyoon Bae, Busan (KR)

(73) Assignee: AUTOELEX CO., LTD., Gimhae-si (KR)

( * ) Notice: Subject to any disclaimer, the term of this patent is extended or adjusted under 35 U.S.C. 154(b) by 0 days.

(21) Appl. No.: 18/836,359

(22) PCT Filed: Nov. 8, 2022

(86) PCT No.: PCT/KR2022/017393
§ 371 (c)(1),
(2) Date: Aug. 7, 2024

(87) PCT Pub. No.: WO2023/158056
PCT Pub. Date: Aug. 24, 2023

(65) Prior Publication Data
US 2025/0137545 A1 May 1, 2025

(30) Foreign Application Priority Data
Feb. 15, 2022 (KR) ........................ 10-2022-0019630

(51) Int. Cl.
*F16K 31/524* (2006.01)
*F16K 31/04* (2006.01)
*F16K 31/53* (2006.01)

(52) U.S. Cl.
CPC ...... *F16K 31/046* (2013.01); *F16K 31/52416* (2013.01); *F16K 31/53* (2013.01)

(58) Field of Classification Search
None
See application file for complete search history.

(56) References Cited

U.S. PATENT DOCUMENTS

| | | | |
|---|---|---|---|
| 4,301,830 A | 11/1981 | Keller, III | |
| 9,408,990 B2 * | 8/2016 | Ji | A61M 16/208 |
| 10,859,172 B2 * | 12/2020 | Doi | F16K 11/0743 |
| 12,110,986 B2 * | 10/2024 | Liu | F16K 31/52416 |

(Continued)

FOREIGN PATENT DOCUMENTS

| | | |
|---|---|---|
| CN | 113738915 A | 12/2021 |
| JP | 2002195694 A | 7/2002 |

(Continued)

*Primary Examiner* — Matthew W Jellett
(74) *Attorney, Agent, or Firm* — NKL Law; Jae Youn Kim

(57) ABSTRACT

There is provided a flow path switching valve. The flow path switching valve includes: a valve body having an inlet pipe and first and second outlet pipes and including an inlet hole and first and second cam accommodation depressions; first and second cams accommodated in the first and second cam accommodation depressions, respectively, and configured to block the outflow of a specific gas; a cam disk including a first and second cam compression protrusion configured to switch the flow path of the specific gas by compressing at least one of the first and second cams and a first or second cam compression protrusion configured to block the outflow of the specific gas by compressing one of the first and second cams; a cover coupled to the valve body while covering the cam disk; and a motor provided on the cover, and configured to switch the flow path.

5 Claims, 8 Drawing Sheets

100

Gas Tank

112in
112a
112b
110
130
120

Chamber

(56)           References Cited

U.S. PATENT DOCUMENTS

2019/0078495 A1      3/2019  Lee et al.
2020/0353202 A1*    11/2020  Miller ................. A61M 16/202
2021/0207728 A1*     7/2021  Alali ...................... F16K 11/22
2022/0042289 A1      2/2022  Hopfauf et al.

FOREIGN PATENT DOCUMENTS

KR          100490719  B1      5/2005
KR          20050107679  A    11/2005
KR          101339338  B1     12/2013
KR          20140045760  A      4/2014

* cited by examiner

FLOW PATH SWITCHING VALVE

TECHNICAL FIELD

The present invention relates to a flow path switching valve, and more particularly, to a flow path switching valve that may supply a specific gas from a place where the specific gas is provided to a place where a specific gas concentration is required, may allow the specific gas to flow out to the outside, or may block the specific gas from being supplied to a place where a specific gas concentration is required and also from flowing out to the outside.

BACKGROUND ART

A phenomenon occurs in which as society develops, it becomes materially rich but becomes emotionally deprived.

Accordingly, people often welcome companion animals as new family members for emotional stability.

As companion animals are living creatures, living with them requires lots of sincerity and financial costs.

In this case, what comes first is the health issue of companion animals.

However, general companion animal owners who are not experts on companion animals do not know in detail about the health status of their companion animals.

Furthermore, it is sufficient to visit a veterinary hospital when a companion animal is seriously ill, but it is difficult to visit a veterinary hospital every time a companion animal shows a mild symptom.

Accordingly, there is a need for a chamber that provides care for a companion animal when the health status of the companion animal is suspected so that the health status of the companion animal can improve or be prevented from further deteriorating.

Generally, oxygen (O2) treatment is performed for the care of companion animals. For this oxygen treatment, a specific oxygen concentration is required.

However, when oxygen is continuously supplied to a chamber from an oxygen tank or oxygen generator, an excessive oxygen concentration in the chamber may cause side effects rather than the treatment of a companion animal.

Therefore, there is a demand for a flow path switching valve that may keep the oxygen concentration in a chamber constant by switching a flow path so that the oxygen supplied from an oxygen tank or oxygen generator can flow into or out of the chamber depending on the oxygen concentration in the chamber.

DISCLOSURE

Technical Problem

An object to be achieved by the present invention is to provide a flow path switching valve that supplies a specific gas from a place where the specific gas is provided to a place where a specific gas concentration is required, allows the specific gas to flow out to the outside, or blocks the specific gas from being supplied to a place where a specific gas concentration is required and also from flowing out to the outside, thereby keeping the concentration of the specific gas constant in a place where the specific gas will be supplied.

The objects to be achieved by the present invention are not limited to the object mentioned above, and other objects not mentioned will be clearly understood by those skilled in the art from the following description.

Technical Solution

In order to accomplish the above object, the present invention provides a flow path switching valve. The flow path switching valve may include: a valve body having an inlet pipe and first and second outlet pipes on one side thereof, and including an inlet hole corresponding to one end of the inlet pipe, and first and second cam accommodation depressions corresponding to first ends of the first and second outlet pipes, respectively; first and second cams accommodated in the first and second cam accommodation depressions, respectively, and configured to block the outflow of a specific gas; a cam disk including a first cam compression protrusion configured to switch the flow path of the specific gas by compressing at least one of the first and second cams and a second cam compression protrusion configured to block the outflow of the specific gas by compressing one of the first and second cams; a cover coupled to the valve body while covering the cam disk; and a motor provided on the cover, and configured to switch the flow path of the specific gas by rotating the cam disk. The motor may switch the flow path of the specific gas to allow the specific gas to flow out to the outside when the concentration of the specific gas in a place where the specific gas is supplied is higher than a set value, and may switch the flow path of the specific gas to allow the specific gas to flow out to a place where the specific gas is supplied when the concentration of the specific gas in the place where the specific gas is supplied is lower than the set value.

The flow path switching valve may further include first and second cam springs configured to accommodate portions of the first and second cams in order to provide elastic force to the first and second cams while being accommodated in the first and second cam accommodation depressions, respectively.

The flow path switching valve may further include a sealing O-ring fitted over the shaft of the motor and provided between the cam disk and the cover.

The motor may be an electric geared motor.

The flow path switching valve may further include first and second cam rubbers provided between the first and second cams and the first and second outlet pipes in order to increase sealing force for the first and second outlet pipes while being accommodated in the first and second cam accommodation depressions, respectively.

Advantageous Effects

As described above, according to the technical solution of the present invention, the flow path switching valve includes: the valve body having the inlet pipe and the first and second outlet pipes on one side thereof, and including the inlet hole corresponding to one end of the inlet pipe and the first and second cam accommodation depressions corresponding to first ends of the first and second outlet pipes, respectively; the first and second cams accommodated in the first and second cam accommodation depressions, respectively, and configured to block the outflow of a specific gas; the cam disk including the first cam compression protrusion configured to switch the flow path of the specific gas by compressing at least one of the first and second cams and the second cam compression protrusion configured to block the outflow of the specific gas by compressing one of the first and second cams; and a motor configured to switch the flow path of the specific gas by rotating the cam disk. Accordingly, the specific gas may be supplied from a place where the specific gas is provided to a place where a specific gas concentration is required, the specific gas may be allowed to flow out to the outside, or the specific gas may be blocked from being supplied to a place where a specific gas concentration is required and also from flowing out to the outside. Therefore, there may be provided the flow path switching valve that may keep the concentration of the specific gas constant in a place where the specific gas will be supplied.

MODE FOR INVENTION

Figure 1:
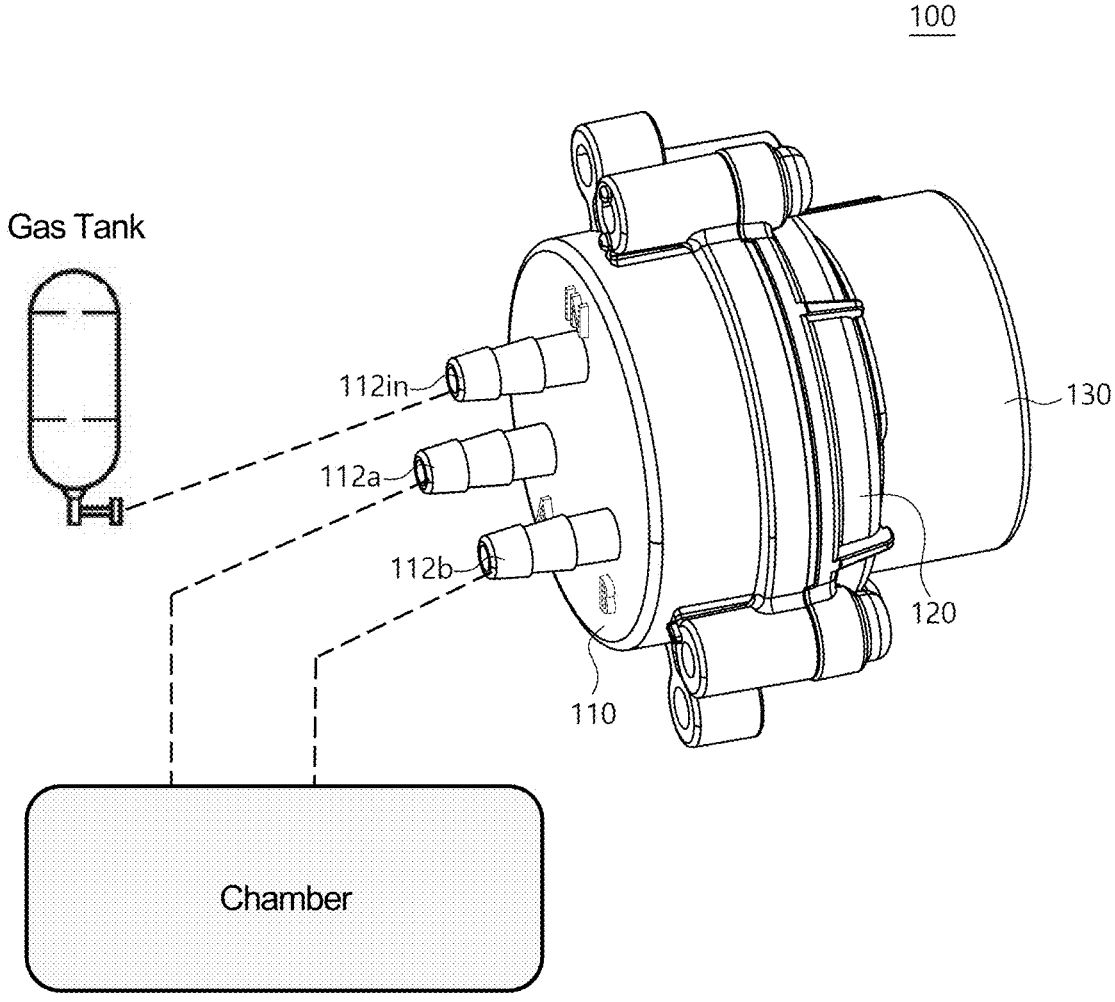
FIG. 1 is a three-dimensional diagram illustrating a flow path switching valve according to embodiments of the present invention.

Hereinafter, preferred embodiments of the present invention will be described in detail with reference to the accompanying drawings. The advantages and features of the present invention and methods for achieving them will become apparent by referring to the embodiments described in detail below along with the accompanying drawings. However, the present invention is not limited to the embodiments described herein, and may be embodied in different forms. Rather, the embodiments introduced herein are provided such that the disclosed content can be thorough and complete and the spirit of the invention can be sufficiently conveyed to those skilled in the art, and the present invention is defined only by the scope of the claims.

The same reference symbols refer to the same elements throughout the specification. Accordingly, the same or similar reference symbols may be described with reference to other drawings even when they are not mentioned or described in corresponding drawings. Additionally, even when reference symbols are not indicated, descriptions thereof may be made with reference to other drawings.

The terminology used herein is intended to describe embodiments, but is not intended to limit the present invention. In the present specification, singular forms also include plural forms, unless specifically stated otherwise in the context. The terms 'comprises' and/or 'comprising' used herein do not exclude the presence or addition of one or more other components, steps, operations, and/or devices other than one or more components, steps, operations, and/or devices mentioned. Additionally, since the following description will be made based on preferred embodiments, reference symbols presented according to the sequence of description are not necessarily limited to that sequence.

When an element is described as being 'connected to' or 'coupled to' another element, it includes both the case where one element is directly connected to or coupled to the other element and the case where those elements are connected to or coupled to each other with a third element intervening therebetween. In contrast, when an element is described as being 'directly connected to' or 'directly coupled to' another element, it indicates that there is no intervening other element. The term 'and/or' includes each of mentioned items and all combinations of one or more of the mentioned items.

Spatially relative terms such as 'below,' 'beneath,' 'lower,' 'above,' 'upper,' etc. are used to easily describe the correlation of one device or element with another device or element as shown in the drawings. Spatially relative terms should be understood to include different orientations of a device during use or operation in addition to the orientations shown in the drawings. For example, when a device shown in the drawings is turned over, a device described as being 'below' or 'beneath' another device may be placed 'above' the other device. Accordingly, the illustrative term 'down' may include both downward and upward directions. The device may also be oriented in other directions, so that spatially relative terms may each be interpreted according to the orientation.

Furthermore, the embodiments described herein will be described with reference to sectional and/or plan views, which are ideal illustrations of the present invention. In the drawings, the thicknesses of films and regions are exaggerated for the effective illustration of technical items. Accordingly, the forms of illustrations may be modified depending on manufacturing technology and/or tolerance. Therefore, embodiments of the present invention are not limited to the specific forms shown, but also include changes in the forms generated according to the manufacturing process. As a result, the regions illustrated in the drawings have schematic properties, and the shapes of the regions illustrated in the drawings are intended to illustrate the specific shapes of the regions of devices and are not intended to limit the scope of the invention.

Figure 2:
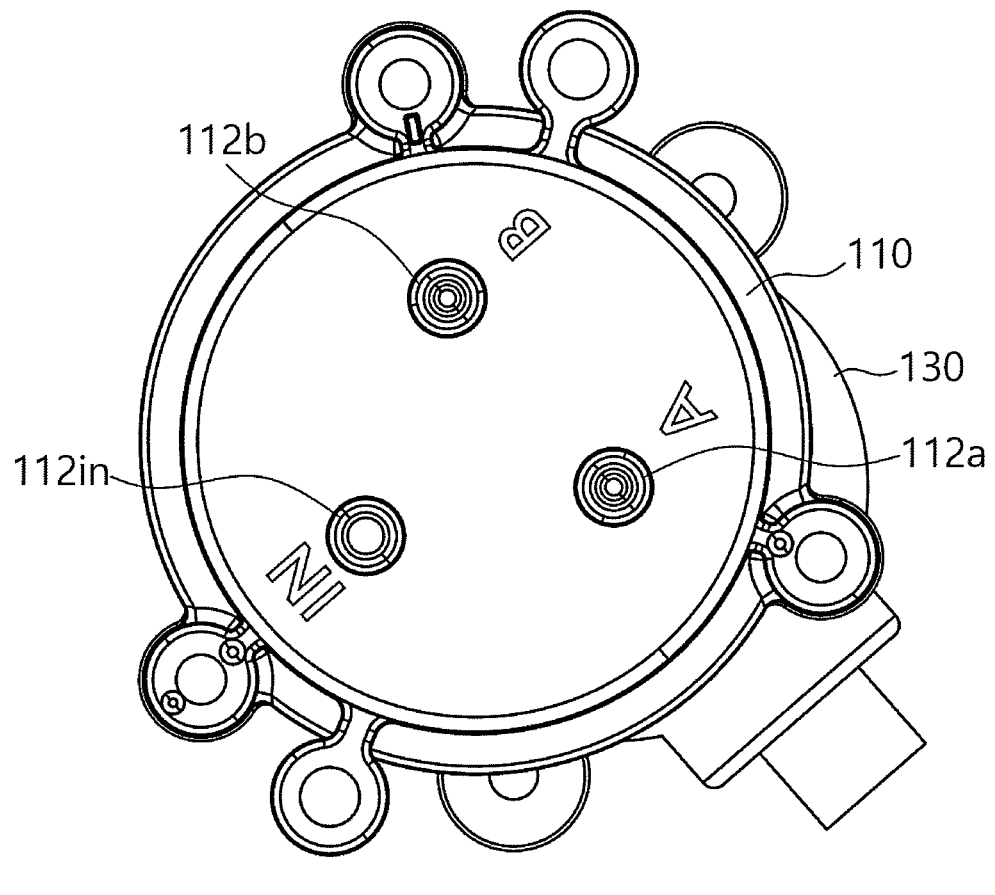
FIG. 2 is a plan view illustrating the flow path switching valve according to the embodiments of the present invention.
Figure 3:
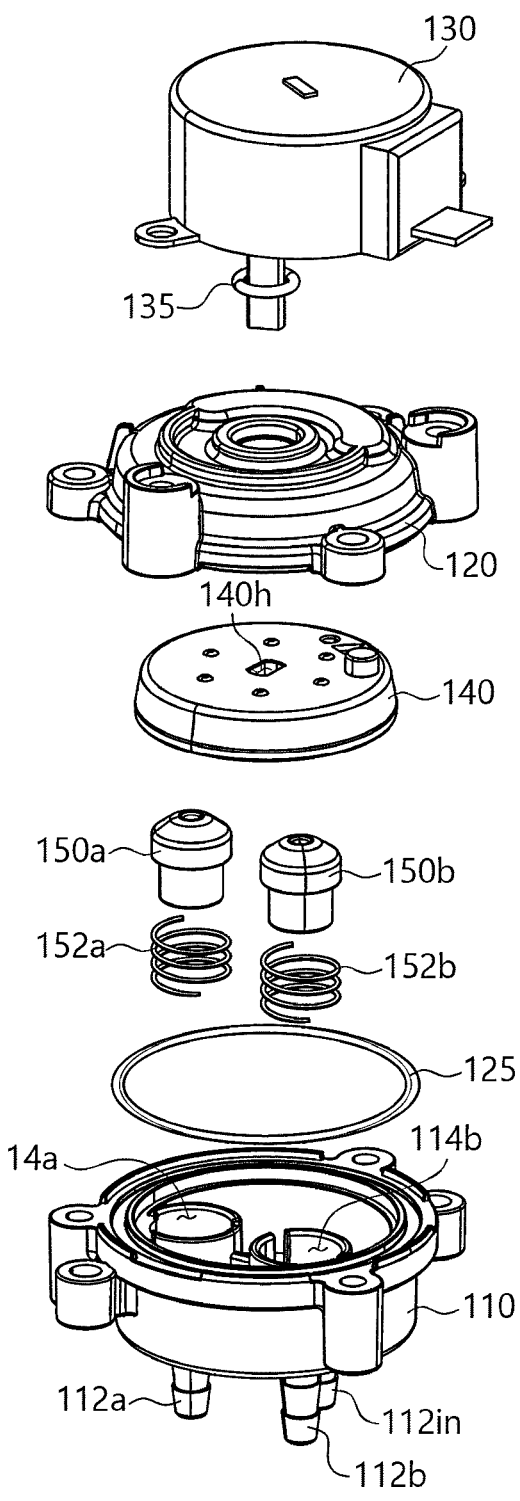
FIG. 3 is an exploded three-dimensional view illustrating the flow path switching valve according to the embodiments of the present invention.
Figure 4:
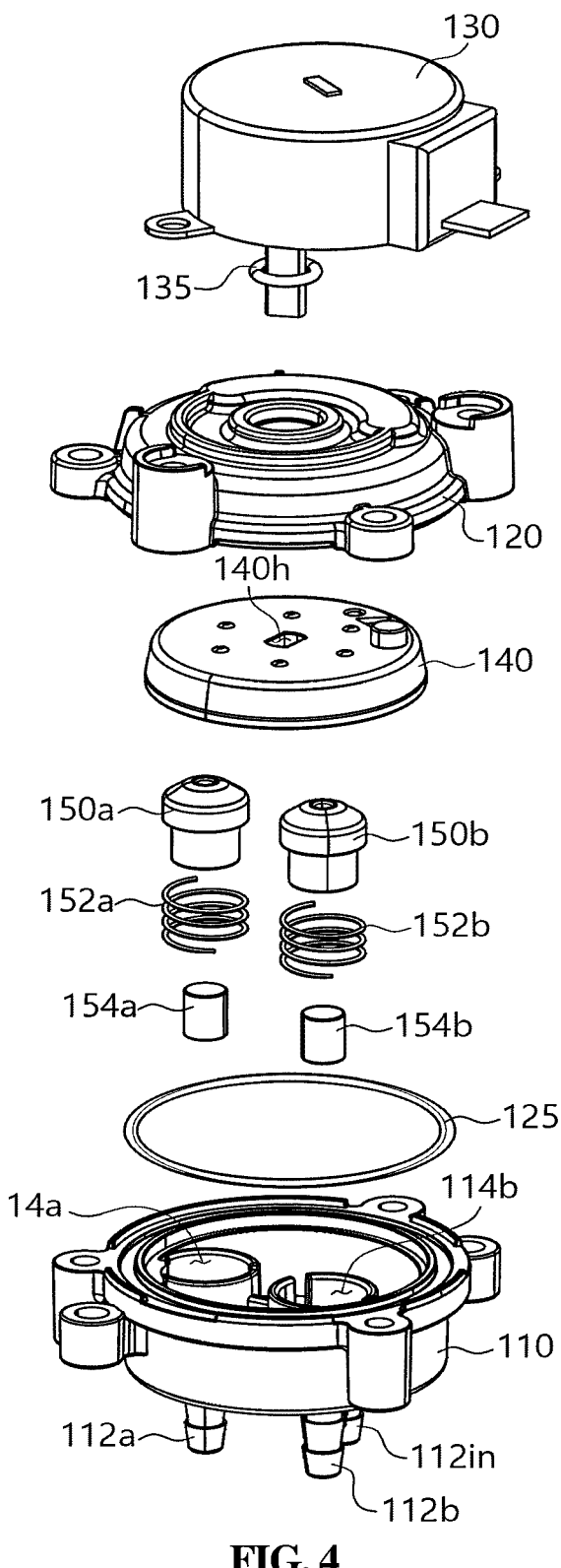
FIG. 4 is an exploded three-dimensional view illustrating a flow path switching valve according to another embodiment of the present invention.
Figure 5:
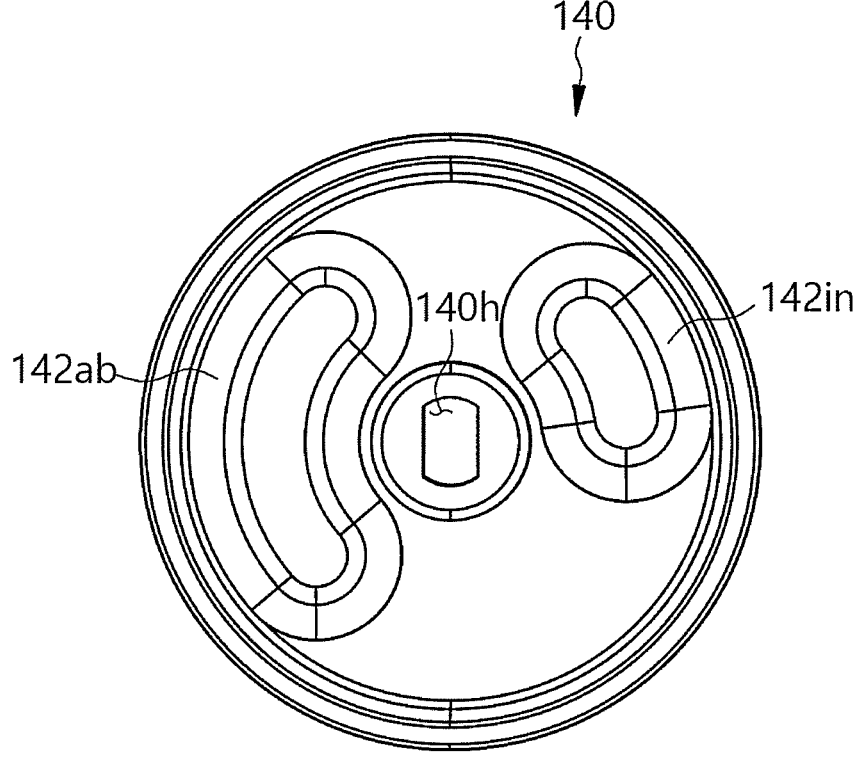
FIG. 5 is a plan view illustrating a cam disk, which is a component of the flow path switching valve according to the embodiments of the present invention.
Figure 6:
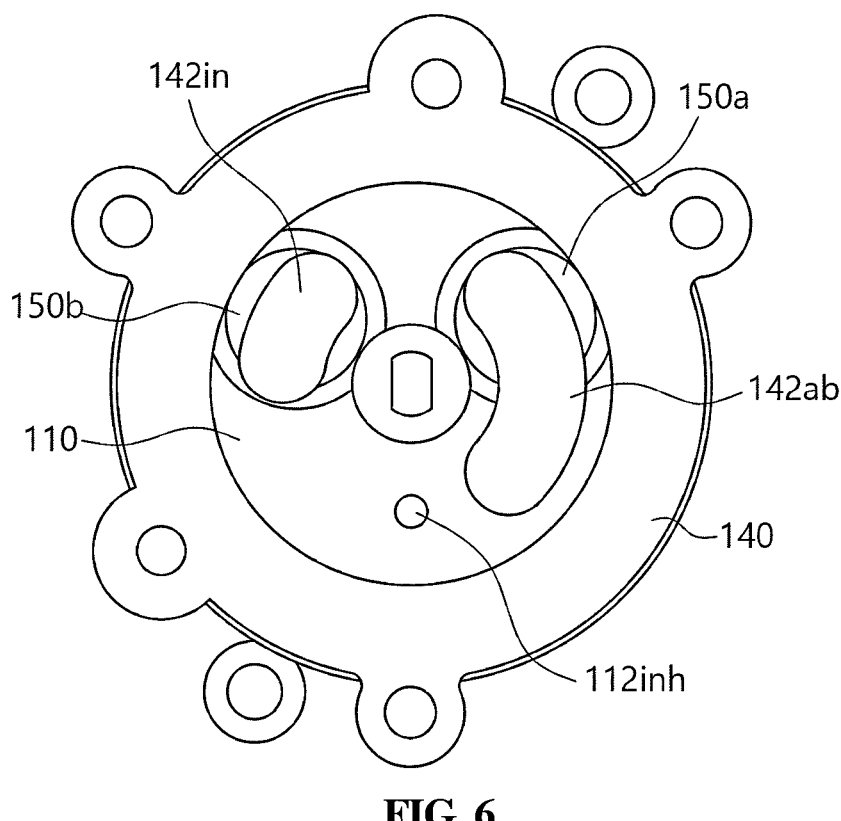
FIGS. 6 to 8 are cutaway plan views illustrating the operation process of the flow path switching valve according to the embodiments of the present invention.
Figure 7:
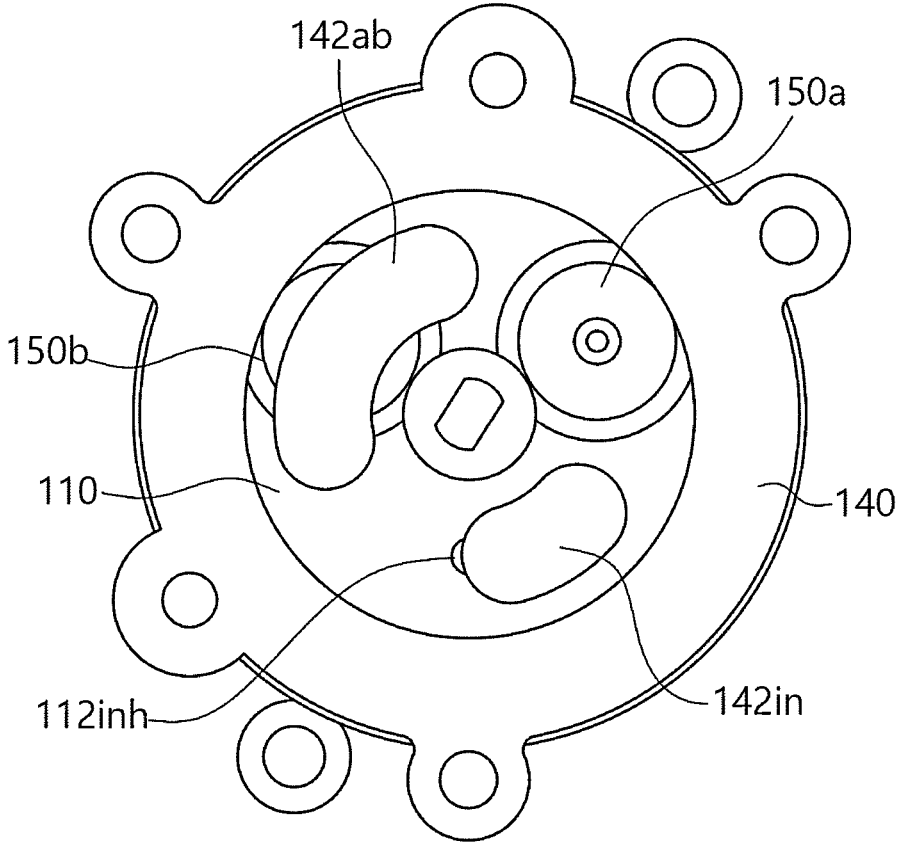
Figure 8:
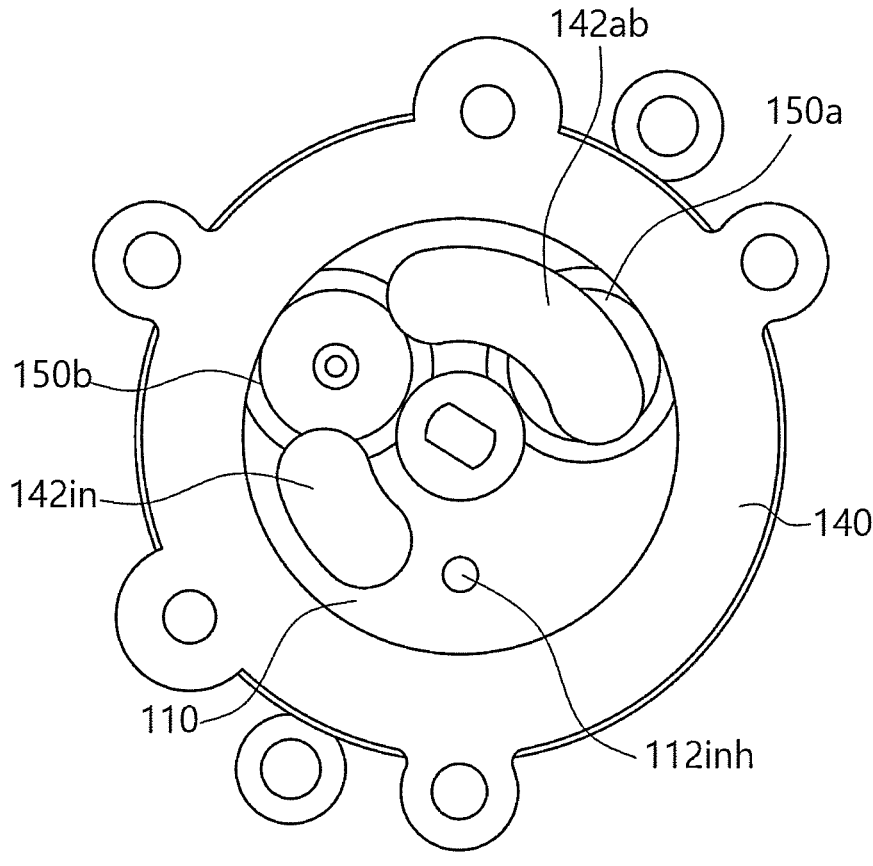

FIG. 1 is a three-dimensional diagram illustrating a flow path switching valve according to embodiments of the present invention, FIG. 2 is a plan view illustrating the flow path switching valve according to the embodiments of the present invention, FIG. 3 is an exploded three-dimensional view illustrating the flow path switching valve according to the embodiments of the present invention, FIG. 4 is an exploded three-dimensional view illustrating a flow path switching valve according to another embodiment of the present invention, FIG. 5 is a plan view illustrating a cam disk, which is a component of the flow path switching valve according to the embodiments of the present invention, and FIGS. 6 to 8 are cutaway plan views illustrating the operation process of the flow path switching valve according to the embodiments of the present invention.

Referring to FIGS. 1 to 5, the flow path switching valve 100 may include a valve body 110, first and second cams 150a and 150b, a cam disk 140, a cover 120, and a motor 130.

The valve body 110 may have an inlet pipe 112 in and first and second outlet pipes 112a and 112b on one side thereof. Furthermore, the valve body 110 includes an inlet hole 112inh corresponding to one end of the inlet pipe 112in, and first and second cam accommodation depressions 114a and 114b corresponding to first ends of the first and second outlet pipes 112a and 112b, respectively.

In this case, the inlet pipe 112 in may be connected to an oxygen tank or oxygen generator for the supply of oxygen.

The first and second outlet pipes 112a and 112b may be connected to the chamber, in which care for a companion animal is performed, and the outside of the chamber, respectively.

The first and second cams 150a and 150b may be accommodated in the first and second cam accommodation depressions 114a and 114b of the valve body 110, respectively, and may block the outflow of a specific gas.

In this case, the specific gas may be oxygen.

The flow path switching valve 100 according to the embodiments of the present invention may include first and second cam springs 152a and 152b configured to accommodate portions of the first and second cams 150a and 150b in order to provide elastic force to the first and second cams 150a and 150b while being accommodated in the first and second cam accommodation depressions 114a and 114b of the valve body 110, respectively.

Accordingly, the opening and closing operations performed by the first and second cams 150a and 150b for the first and second outlet pipes 112a and 112b may be facilitated by the first and second cam springs 152a and 152b.

The flow path switching valve 100 according to another embodiment of the present invention may include first and second cam rubbers 154a and 154b provided between the first and second cams 150a and 150b and the first and second outlet pipes 112a and 112b in order to increase sealing force for the first and second outlet pipes 112a and 112b while being accommodated in the first and second cam accommodation depressions 114a and 114b of the valve body 110, respectively.

Accordingly, the sealing force for the first and second outlet pipes 112a and 112b may be increased by the first and second cam rubbers 154a and 154b.

The cam disk 140 may include a first cam compression protrusion 142ab configured to switch the flow path of the specific gas by compressing at least one of the first and second cams 150a and 150b, and a second cam compression protrusion 142 in configured to block the outflow of the specific gas by compressing one of the first and second cams 150a and 150b.

The cover 120 may be coupled to the valve body 110 while covering the cam disk 140. The flow path switching valve 100 according to the embodiments of the present invention may be provided between the valve body 110 and the cover 120, and may include an O-ring 125 for a valve body for sealing between the valve body 110 and the cover 120.

The motor 130 is provided on the cover 120, and may switch the flow path of the specific gas by rotating the cam disk 140.

The shaft of the motor 130 may be inserted into the motor shaft coupling hole 140h of the cam disk 140. Accordingly, as the cam disk 140 is rotated in response to the driving of the motor 130, the first cam compression protrusion 142ab of the cam disk 140 switches the flow path of a specific gas by compressing at least one of the first and second cams 150a and 150b. Furthermore, the second cam compression protrusions 142 in may block the outflow of a specific gas by compressing one of the first or second cams 150a or 150b.

When the concentration of the specific gas in a place where the specific gas is supplied is higher than a set value, the motor 130 may switch the flow path of the specific gas to allow the specific gas to flow out to the outside. In contrast, when the concentration of the specific gas in a place where the specific gas is supplied is lower than the set value, the motor 130 may switch the flow path of the specific gas to allow the specific gas to flow out to the place where the specific gas is supplied.

The motor 130 may be an electric geared motor.

The flow path switching valve 100 according to the embodiments of the present invention may include a motor O-ring 135 fitted over the shaft of the motor 130, provided between the cam disk 140 and the cover 120, and configured to seal the cam disk 140 and the cover 120.

Referring to FIGS. 6 to 8, the flow path switching valve (see 100 in FIG. 1) may be provided between the oxygen tank or oxygen generator providing oxygen and the chamber for the care of a companion animal.

In the case where the flow path switching valve according to the embodiments of the present invention is provided between the oxygen tank and the chamber for the care of a companion animal, as shown in FIG. 7, when oxygen is supplied from the oxygen tank, the first cam compression protrusions 142ab of the cam disk 140 may supply oxygen to the chamber by compressing only the second cam 150b. Furthermore, as shown in FIG. 6, when oxygen is not supplied from the oxygen tank, the first cam compression protrusion 142ab of the cam disk 140 may compress the first cam 150a, and the second cam compression protrusion 142 in may compress the second cam 150b to block the outflow of oxygen. Additionally, as shown in FIG. 8, when oxygen is supplied from the oxygen tank and the oxygen concentration in the chamber is higher than the set value, the first cam compression protrusion 142ab may compress only the first cam 150a to switch the flow path of oxygen, thereby allowing oxygen to flow out to the outside.

In the case where the flow path switching valve according to the embodiments of the present invention is provided between the oxygen generator and the chamber for the care of a companion animal, as shown in FIG. 7, when oxygen is supplied from the oxygen generator, the first cam compression protrusion 142ab of the cam disk 140 may compress only the second cam 150b to supply oxygen to the chamber. Furthermore, as shown in FIG. 8, when oxygen is not supplied from the oxygen generator, the first cam compression protrusion 142ab may compress only the first cam 150a to switch the flow path of oxygen, thereby allowing oxygen to flow out to the outside.

The flow path switching valve according to an embodiment of the present invention includes: the valve body having the inlet pipe and the first and second outlet pipes on one side thereof, and including the inlet hole corresponding to one end of the inlet pipe and the first and second cam accommodation depressions corresponding to first ends of the first and second outlet pipes, respectively; the first and second cams accommodated in the first and second cam accommodation depressions, respectively, and configured to block the outflow of a specific gas; the cam disk including the first cam compression protrusion configured to switch the flow path of the specific gas by compressing at least one of the first and second cams and the second cam compression protrusion configured to block the outflow of the specific gas by compressing one of the first and second cams; and a motor configured to switch the flow path of the specific gas by rotating the cam disk. Accordingly, the specific gas may be supplied from a place where the specific gas is provided to a place where a specific gas concentration is required, the specific gas may be allowed to flow out to the outside, or the specific gas may be blocked from being supplied to a place where a specific gas concentration is required and also from flowing out to the outside. As a result, there may be provided the flow path switching valve that may keep the concentration of the specific gas constant in a place where the specific gas will be supplied.

Although the embodiments of the present invention have been described above with reference to the accompanying drawings, those having ordinary skill in the art to which the present invention pertains will understand that the present invention may be implemented in other specific forms without changing the technical spirit or essential features. Therefore, the embodiments described above should be understood in all respects as illustrative and not restrictive.

The invention claimed is:

1. A flow path switching valve, comprising:

a valve body including: an inlet pipe, a first outlet pipe, and a second outlet pipe, wherein at least one of the inlet pipe, the first outlet pipe, or second outlet pipe is disposed on one side thereof; an inlet hole connected to one end of the inlet pipe; and a first cam accommodation depression connected to one end of the first outlet pipe and a second cam accommodation depression connected to one end of the second outlet pipes;

a first cam and a second cam respectively accommodated in the first and second cam accommodation depressions and configured to block an outflow of a gas through the first and second outlet pipes;

a cam disk including a first cam compression protrusion configured to switch a flow path of the gas;

a cover coupled to the valve body and covering the cam disk; and a motor disposed on the cover and configured to switch the flow path of the gas by rotating the cam disk;

wherein the motor switches the flow path of the gas to allow the gas to flow out to an outside of a chamber when a concentration of the gas in the chamber is higher than a set value, and switches the flow path of the gas to allow the gas to flow into the chamber when the concentration of the gas in the chamber is lower than the set value, wherein the inlet pipe is configured to be connected to a gas tank and the first and second outlet pipes are configured to be connected to the chamber, wherein the cam disk is rotatable by the motor according to a supply state, a blocking state, and an emission state, such that:

in the supply state, the first cam compression protrusion compresses the second cam so that the gas flows into the chamber through the first outlet pipe;

in the blocking state, the first cam compression protrusion and a second cam compression protrusion respectively compress the first and second cams so that the outflow of the gas through both the first and second outlet pipes is blocked; and in the emission state, the first cam compression protrusion compresses the first cam so that the gas flows out to the outside of the chamber through the second outlet pipe.

2. The flow path switching valve of claim 1, further comprising a first cam spring and a second cam spring, respectively configured to accommodate portions of the first and second cams in order to provide elastic force to the first and second cams while being respectively accommodated in the first and second cam accommodation depressions.

3. The flow path switching valve of claim 1, further comprising a motor O-ring fitted over a shaft of the motor and disposed between the cam disk and the cover.

4. The flow path switching valve of claim 1, wherein the motor is an electric geared motor.

5. The flow path switching valve of claim 1, further comprising a first cam rubber and a second cam rubber, respectively disposed between the first and second cams and the first and second outlet pipes in order to increase sealing force for the first and second outlet pipes while being respectively accommodated in the first and second cam accommodation depressions.

* * * * *